Dickson & Richmond.
Garden Bed Border.

No. 113,145. Patented Mar. 28, 1871.

Witnesses,
Ellen A. Dickson
Emma M. Rice

Inventors,
Joseph Edgar Dickson
Seelye Richmond

UNITED STATES PATENT OFFICE.

JOSEPH EDGAR DICKSON AND SEELYE RICHMOND, OF ANNAPOLIS, MD.

IMPROVEMENT IN GARDEN-BED BORDERS.

Specification forming part of Letters Patent No. 113,145, dated March 28, 1871.

We, JOSEPH EDGAR DICKSON and SEELYE RICHMOND, both of Annapolis, in the county of Anne Arundel and State of Maryland, have jointly invented an Improvement in Garden-Bed Borders, of which the following is a specification:

Nature and Objects of the Invention.

Our invention consists in an improved border or curbing for garden-beds, mounds of earth, grass-plats, &c., the object of our invention being to furnish a cheap, durable, and tasteful substitute for the borders or edging of various materials now commonly used for inclosing garden-beds and other plats of ground, and at the same time providing, if desired, on account of the coldness and dampness of the soil, or for other reasons, in addition to a firm, durable, and tasteful border for garden-beds and other plats of ground, likewise an economical, neat, efficient, durable, and otherwise suitable support, curbing, and border to raised beds or mounds of earth.

The materials commonly employed by the great mass of people in moderate circumstances, and even many others, on account of the great expense of stone-work in inclosing garden-beds, grass-plats, and mounds of earth in their front gardens, cemeteries, and elsewhere, are, for the most part, sods, shrubs, slabs of wood or boards with stakes, common sea-shells, and bricks, standing upright, vertically, or diagonally, partially embedded in the earth—materials which are objectionable, since they either, as in the case of sods and shrubs, involve constant attention and labor in cutting and trimming, and are not at all serviceable as a support or curbing to raised beds or mounds of earth, or they do not, as in the case of slabs of wood and other material, boards, shingles, and bricks, combine the desirable qualities of strength, durability, and a neat and tasteful appearance; the latter materials, when thus used, admitting of neither being embedded in the earth to the necessary depth, nor of being securely combined and fastened to secure the needed result—solidity and firmness.

In the case of wooden slabs or boards and stakes, which are in common use for the purposes specified, especially for keeping in place and form raised garden-beds and mounds of earth, great trouble and inconvenience are experienced, and an unsightly appearance frequently occasioned by the rapid decay of the perishable materials employed.

Description of the Accompanying Drawing.

Figure 1:
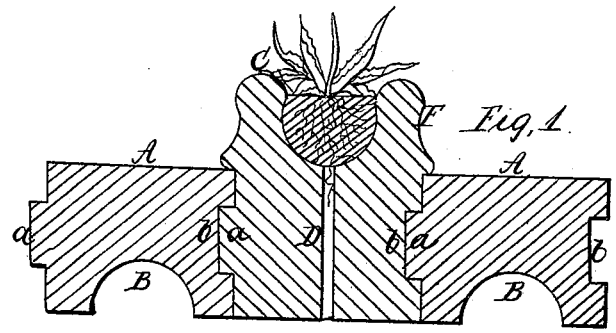
Figure 2:
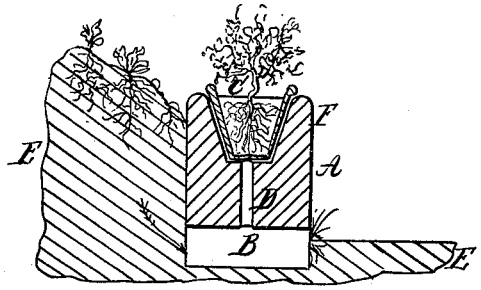

Figure 1 is a longitudinal sectional view of our improved garden-bed border in position. Fig. 2 is a transverse sectional view of our improved garden-bed border in position and use, forming a border and support or curbing to the raised garden-bed or mound of earth E.

Like letters indicate like parts in the several figures.

General Description.

Our improved garden-border is made of brick material, concrete, béton, or other artificial stone, formed in blocks or sections of moderate length, so that by their lightness they may readily be handled and transported, and being suitably tongued and grooved, *a b*, or mortised and tenoned, *a b*, for the purpose of combination, they readily admit of being placed in position, properly adjusted, and firmly and securely combined, the blocks or sections, when thus joined and combined by the aid of cement, forming a mutual support. The border or curb is thereby rendered strong and firm, even with but a slightly-excavated trench, if so desired, thus being arranged and consolidated, so as to produce a continuous border, forming inclosures of a variety of forms and sizes, according to the garden-spaces, mounds, or grass-plats, and the tastes of the owner.

For the double purpose of rendering the blocks or sections of less weight and for supplying drainage, especially when the blocks are used for inclosing and curbing, thereby keeping in place and form raised beds or mounds of earth, which might otherwise be cold and damp, the base of the blocks or sections may be formed with an open space or groove, B, forming an arch or otherwise, as convenient or desirable, but which, if so desired, need not be at all or but slightly apparent when the blocks or sections are properly placed, arranged, adjusted, and combined.

When desired, the lower part or foot of the section may be inserted into a grooved or mortised base of the same or similar material, and therein rendered firm by the use of cement, The upper portion, F, of these blocks or sections is made of a variety of forms, more or less ornamental, and furnished at intervals with receptacles for flower-pots containing earth and growing plants and flowers, or for the plants and flowers directly, the receptacles for the purpose of drainage communicating with the earth below, when the blocks are placed in position, by means of a passage from the receptacle downward through the block or section; or at intervals the blocks or sections may be combined in the manner described with hollowed blocks of the same or similar material which forms the receptacles for flower-pots containing growing plants, or for the earth and growing plants directly.

Claims.

What we claim as our invention, and desire to secure by Letters Patent, is—

1. The molded bordering block or tile herein described, provided with the projections a, recesses b, and transverse arch or conduit B, constructed and arranged substantially as shown and described.

2. The molded bordering block or tile herein described, provided with the projections a, recesses b, and recess C, constructed and arranged substantially as and for the purposes set forth.

3. In the blocks or tiles herein described, the recess C and passage D, substantially as and for the purpose set forth.

JOSEPH EDGAR DICKSON.
SEELYE RICHMOND.

Witnesses:
ELLEN A. DICKSON,
EMMA M. RICE.